(12) United States Patent
Holt et al.

(10) Patent No.: US 8,800,732 B2
(45) Date of Patent: Aug. 12, 2014

(54) HYDRAULIC DAMPER SPOOL VALVE

(75) Inventors: Laurence J. Holt, Goodwood (CA);
Damian O'Flynn, Ixworth (GB);
Andrew Tomlin, Newmarket (GB)

(73) Assignee: Multimatic Inc. (CA)

( * ) Notice: Subject to any disclaimer, the term of this patent is extended or adjusted under 35 U.S.C. 154(b) by 490 days.

(21) Appl. No.: 13/035,846

(22) Filed: Feb. 25, 2011

(65) Prior Publication Data
US 2012/0217106 A1    Aug. 30, 2012

(51) Int. Cl.
*F16F 9/34*    (2006.01)

(52) U.S. Cl.
USPC .................. 188/322.13; 188/322.15; 188/313

(58) Field of Classification Search
USPC .................... 188/313, 322.13, 322.14, 322.15
See application file for complete search history.

(56) References Cited

U.S. PATENT DOCUMENTS 5,386,892 A * 2/1995 Ashiba ....................... 188/282.8

* cited by examiner

*Primary Examiner* — Bradley King
*Assistant Examiner* — Vu Q Nguyen
(74) *Attorney, Agent, or Firm* — Gigette M. Bejin

(57) ABSTRACT

A hydraulic damper assembly includes a main body, a shaft assembly and a main piston operatively configured to define an upper portion and a lower portion within the main body. A hydraulic damper spool valve is adapted to provide a single path, variable hydraulic flow restriction between the upper portion and lower portion of the main body. The hydraulic damper spool valve is configured with an array of precisely shaped flow apertures that are proportionally opened and closed by a pair of valve spools in response to the pressure differential across the main piston. The damper's pressure-flow operating characteristic is simply and predictably dictated by the geometric configuration of the shaped flow apertures. The precisely defined open area of the shaped flow apertures provides a mathematically predictable hydraulic flow restriction that operates predominately in a turbulent regime resulting in insensitivity to hydraulic fluid viscosity and consequently temperature change.

2 Claims, 10 Drawing Sheets

HYDRAULIC DAMPER SPOOL VALVE

BACKGROUND

The present disclosure relates to a valve for a hydraulic damper including a hydraulic damper for use in wheeled vehicle suspension.

Hydraulic dampers which are used to control dynamic systems generally utilize a piston adapted to be slideably carried within a cylindrical main body and peripherally sealed to its walls. The piston is configured to be attached to a shaft assembly. The piston divides the cylindrical main body into two portions (an upper portion and a lower portion) that are connected by restrictive passages which retard the rate of fluid flow between the upper portion and the lower portion when the shaft assembly moves relative to the main body. In this manner, the damper's core operating characteristic, defined by the relationship between pressure and flow is dictated by the geometric configuration of restrictive passages between the upper portion and the lower portion.

If the restrictive passages are simply configured as fixed orifices then the pressure generated across the damper piston increases as the square of the hydraulic flow through the orifices. Unfortunately, this squared law pressure-flow relationship is not a desirable characteristic for controlling the majority of dynamic systems. In the case of an automotive suspension system the damper is normally referred to as a shock absorber and the pressure-flow characteristic is directly proportional to the shock absorber's defining force-velocity relationship which is generally required to be linear or even somewhat digressive. The method of achieving damper characteristics that differ from the basic fixed orifice square law is to vary the area of the orifice in a predetermined relationship to the pressure across the piston.

The most common variable orifice damper valve arrangement consists of a stack of compliant plates fixed in place over an array of passages that connect the upper portion and the lower portion either through or around the piston. The pressure across the piston imparts a load on the plates causing them to deflect which in turn uncovers the passages and creates a path for the damper's hydraulic fluid. The magnitude of the deflection of the plates varies, in proportion to the pressure across the piston and so creates a form of a variable orifice. U.S. Pat. No. 2,748,898 to DeCarbon is the earliest reference to such an arrangement and describes a double acting shock absorber in which the piston is configured with an arrangement of passages that are sealed by resilient leaf elements that are stressed and resiliently bent by fluid issuing under pressure from the passages. The '898 patent also details a unique, but now widely utilized, method of arranging the passages and two sets of leaf elements, above and below the piston, so as to facilitate independent and possibly asymmetric pressure-flow characteristics in the two different operating directions.

The most significant limitation of using compliant plates to create a variable orifice damper valve is that the pressure-flow characteristic is highly dependent on the deformed shape of the compliant plates which in turn is extremely sensitive to plate thickness, plate material properties, dimensional tolerance of the plate shape, assembly process, friction between the plates in a stack, preload on the plates in a stack, locational tolerance of the passages relative to the plates, dimensional tolerance of the passage cross sections, and cleanliness of the assembly. These sensitivities ultimately present a significant challenge to achieving a desired pressure-flow characteristic or when trying to match the characteristic of two dampers. An additional disadvantage of the compliant plate arrangement is that the pressure-flow characteristic cannot be easily predicted using mathematical techniques due to its complex operating mechanism. Another shortcoming of this configuration is that the pressure-flow characteristic tends to diverge from its original curve over time due to the compliant plate material becoming fatigued and losing its stiffness and strength as well as small particles, created from seal, piston and shaft wear, become trapped between the plates.

U.S. Pat. No. 5,547,050 issued to Beck illustrates the complexity associated with manufacturing and assembling a damper that utilizes compliant plates as a variable orifice. The '050 patent describes a method of attaching the plates and piston to a shaft to overcome some of the dimensional limitations associated with the arrangement. However, although the assembly approach outlined by the '050 patent eliminates the tolerances related to the compliant plate attachment, it does not improve the variation associated with the dimensional accuracy of the plates themselves or the divergence from the original pressure-flow characteristic that occurs over time. Moreover, the '050 patent does not describe an arrangement for which the damper's operating characteristic can be mathematically predicted.

U.S. Pat. No. 5,709,290 issued to Ekert et. al. describes a method of providing compression and rebound stop surfaces which uniformly support the compliant plates in their deflected state at both limits of deflection travel. The compliant plates of the '290 patent are prevented from yielding to a deformed condition which can significantly alter the designed-in performance characteristics of the damper assembly. This stop surface arrangement considerably improves the damper's ability to maintain its original pressure-flow characteristic over time. However, this system is particularly sensitive to detailed tolerances such that minor variations in specific design features may result in significant, undesirable changes in performance characteristics.

The limitations of variable orifice damper valves that utilize compliant plate stacks has been recognized. Although numerous alternatives have been suggested, and appear in the prior art, this arrangement remains the absolute dominant approach to providing the desired pressure-flow characteristics in shock absorbers as used in automotive suspension systems.

U.S. Pat. No. 6,311,812 to Sonsterad et. al. offers an alternative to the compliant plate approach by describing a poppet style pressure regulator that utilizes pressure balancing across the poppet to control the area of the resulting annular orifice. The shape of the front side of the poppet can be varied to control the pressure balancing. In this manner, the overall pressure-flow characteristic of the pressure regulator and ultimately a damper that utilizes the device is controlled by the varying area of the annular orifice. Although the '812 patent overcomes many of the tolerance sensitivity problems associated with compliant plate variable orifice damper valves, its basic configuration is limited by only offering an annular orifice hydraulic restriction. This limitation is overcome in alternative embodiments of the disclosure but only through the addition of significant complexity which once again introduces additional sensitivity to manufacturing tolerance. However, the most significant limitation of the valve arrangement of the '812 patent is that the valve arrangement is uni-directional. For the pressure regulator of the '812 patent to be utilized in a double acting shock absorber, an array of one way ball valves are implemented to act in both compression and rebound directions. This limits the pressure-flow characteristic of the damper to be identical in the compression and rebound directions which is rarely desirable. Additionally the pressure regulator of the '812 patent is large and complex; and cannot be contemplated to be integrated into a damper piston. Finally, similar to the compliant plate configurations, the '812 patent does not describe an arrangement for which the pressure-flow characteristic can be mathematically predicted.

An effective but complex solution to the tolerance sensitivity problems that exist in passive variable orifice valves is described in U.S. Pat. No. 5,996,745, issued to Jones et al. The '745 patent claims a damper valve for controlling the pressure-flow and therefore force-velocity characteristic, of a shock absorber that consists of a bender with a piezoelectric material embedded within it. The bender is used in a similar manner to the compliant plates of a conventional damper valve but by supplying a voltage across the piezoelectric material the stiffness of the bender is changed and the pressure required to deform the bender is modified. An electronic sensor is utilized to measure the velocity of the piston and the voltage supplied to bender is varied in relationship to the measured velocity. In this manner, the stiffness of the bender is made dependent on the velocity of the damper and the force-velocity and therefore pressure-flow characteristics actively controlled using a feedback system. Although the piezoelectric material based variable orifice valve of Jones can overcome the tolerance limitations of passive damper valves the associated complexity and cost is prohibitive. Additionally, the '745 patent does not describe an arrangement for which the pressure-flow characteristic can be simply mathematically predicted.

Accordingly, it is desirable to provide a damper valve that eliminates the complexity associated with the existing styles of variable orifice arrangements yet offers a simple configuration that provides a mathematically predictable, repeatable and robust pressure-flow characteristic.

Accordingly, it is desirable to provide a damper valve that eliminates the complexity associated with the existing styles of variable orifice arrangements yet offers a simple configuration that provides a mathematically predictable, repeatable and robust pressure-flow characteristic.

SUMMARY

An object of the present disclosure is to therefore provide a valve for a hydraulic damper that reduces the number of required components, simplifies the assembly procedure, lowers the manufacturing cost and improves the overall performance of the damper. Accordingly, the valve is configured to control the flow of hydraulic fluid across the main piston of the damper in a predetermined relationship to the pressure differential across the main piston via a variable orifice arrangement based on proportionally blocked shaped apertures. The shaped apertures are configured to provide a single path for the hydraulic fluid between an upper portion and a lower portion of the damper main body and are adapted to be proportionally opened and closed in response to the pressure differential across the main piston. In this manner the damper's operating characteristic is simply and predictably dictated by the geometric configuration of the shaped apertures. The precisely defined open area of the shaped apertures provides a mathematically predictable hydraulic flow restriction that operates predominately in a turbulent regime resulting in insensitivity to hydraulic fluid viscosity and consequently temperature change.

Therefore, in the preferred embodiment of the present disclosure a hydraulic damper spool valve is adapted be affixed to the main piston of the damper and comprises a valve body configured with a first opening and a second opening, one of which is in fluid communication with the upper portion of the main body and the second of which is in fluid communication with the lower portion of the main body. The main piston is configured to be connected to a shaft assembly and is adapted to be slideably carried within a cylindrical main body of the damper and peripherally sealed. The valve body is adapted to accept a hollow cylindrical valve sleeve that divides the valve body into a closed outer volume and an inner volume. The hollow cylindrical valve sleeve is configured with an array of shaped apertures in its cylindrical wall that are adapted to hydraulically connect the outer volume and the inner volume. The hollow cylindrical valve sleeve is in turn adapted to accept a pair of valve spools that are configured to selectively direct all of the hydraulic flow, induced by movement of the shaft assembly and damper piston, through portions of the shaped apertures. The valve spools are configured so as to completely block the shaped apertures when the shaft assembly and main piston are stationary so that there is no hydraulic flow path between the upper portion and lower portion of the damper main body. Movement of the shaft assembly and main piston induces operating pressures in either the first opening or second opening of the valve body that causes one or other of the valve spools to move and progressively open selective shaped apertures which provides a hydraulic flow path between the first and second openings and therefore the upper portion and the lower portion of the damper main body. The precisely defined open area of the shaped apertures provides a mathematically predictable hydraulic flow restriction that varies directly in response to the operating pressures of the damper. In this manner, a highly predictable and precise pressure-flow relationship is achieved using only two moving components, therefore significantly reducing the complexity of the damper valve and producing an accurate and repeatable operating characteristic.

In an embodiment of the present disclosure, the hollow cylindrical valve sleeve is configured with an array of rebound flow apertures at one end, an array of compression flow apertures at its opposite end and an array of transfer flow apertures in proximity to its centre. The rebound and compression flow apertures are configured with precise shapes and are adapted to hydraulically connect the outer volume and the inner volume of the hollow cylindrical valve sleeve. The pair of valve spools consists of a rebound control valve spool configured to selectively open and close the rebound flow apertures and a compression control valve spool configured to selectively open and close the compression flow apertures.

When the shaft assembly and main piston travel in a rebound direction the induced pressure in the upper portion of the damper main body causes the rebound control valve spool to move relative to the hollow cylindrical valve sleeve and progressively open the array of rebound flow apertures. When the shaft assembly and main piston travel in a compression direction the induced pressure in the lower portion of the damper's main body causes the compression control valve spool to move relative to the hollow cylindrical valve sleeve and progressively open the array of compression flow apertures.

In an embodiment of the present disclosure the internal bore of the hollow cylindrical valve sleeve is adapted to receive the pair of valve spools with a predetermined, close tolerance radial clearance that is configured to allow longitudinal movement of the valve spools within the internal bore while preventing hydraulic flow through the radial clearance. A coil spring or similar resilient energy storage member is arranged between the rebound control valve spool and the compression control valve spool so as to bias them in opposing directions. The valve spools are configured with flat outer surfaces that restrict their relative longitudinal movement to a stationary limit by abutting with stop surfaces on the valve body. When the valve spools are at their stationary limits the array of rebound flow apertures and array compression flow apertures are completely blocked so that there is no hydraulic path between the first and second openings and therefore no fluid connection between the upper and lower portions of the damper main body.

When the shaft assembly and main piston are moved in a rebound direction, a positive operating pressure is induced in the upper portion of the damper main body which is transferred to the first opening of the valve body causing the pressure to act directly on a first effective piston area defined by the flat outer surface of the rebound control valve spool and induces longitudinal movement of the rebound control valve spool against the biasing force of the coil spring. When the rebound control valve spool moves longitudinally it uncovers a portion of the rebound flow apertures creating a hydraulic flow path between the first opening and the outer volume. This hydraulic flow path allows the hydraulic fluid to flow from the upper portion of the damper main body into the outer volume and subsequently into the inner volume via the array of transfer flow apertures. A one-way check valve and array of exit flow apertures is provided on the flat outer surface of the compression control valve spool so as to create a flow path out of the inner volume into the second opening. In this manner a continuous flow path is created between the upper portion and lower portion of the damper main body with the limiting hydraulic flow area restriction defined by the rebound flow apertures of the hydraulic damper spool valve.

Additionally, when the shaft assembly and damper piston are moved in a compression direction, a positive operating pressure is induced in the lower portion of the damper main body which is transferred to the second opening of the valve body causing the pressure to act directly on a second effective piston area defined by the flat outer surface of the compression control valve spool and induces longitudinal movement of the compression control valve spool against the biasing force of the coil spring. When the compression control valve spool moves longitudinally it uncovers a portion of the compression flow apertures creating a hydraulic flow path between the second opening and the outer volume. This hydraulic flow path allows the hydraulic fluid to flow from the lower portion of the main body into the outer volume and subsequently into the inner volume via the array of transfer flow apertures. A one-way check valve and array of exit flow apertures is provided on the flat outer surface of the rebound control valve spool so as to create a flow path out of the inner volume into the first opening. In this manner a continuous flow path is created between the lower portion and upper portion of the damper main body with the limiting hydraulic flow restriction defined by the compression flow apertures of the hydraulic damper spool valve.

Therefore, the present disclosure provides a highly predictable and precise bi-directional pressure-flow relationship by using only two moving components, therefore significantly reducing the complexity of the damper valve and producing an accurate and repeatable operating performance in both compression and rebound directions. An asymmetric operating characteristic is simply achieved by configuring the profile shape of the rebound flow apertures and compression flow apertures differently. Higher levels of asymmetry can be achieved by arranging the first effective piston area and second effective piston area to have different areas.

The pressure vs. flow relationship of the hydraulic damper can be tuned by altering the rate of the coil spring, changing the pre-load on the coil spring, modifying the first or second effective piston areas defined by the flat outer surfaces of the valve spools or by altering the profile shape of the rebound flow apertures or the compression flow apertures.

It is to be understood that either the array of rebound flow apertures or the array of compression flow apertures could be configured as multiple shaped apertures or as a single shaped aperture defined in the hollow cylindrical valve sleeve. Regardless of the number of shaped apertures, they are all configured with a predetermined profile having a variable width which in turn facilitates desired pressure-flow characteristics between the first opening and second opening and vice-versa. At any point in the longitudinal movement of the valve spools the opening of the shaped apertures offers a mathematically predictive hydraulic flow restriction based on established orifice flow theory. For a given coil spring rate and preload, the shaped aperture profiles can be configured to produce a wide range of pressure-flow characteristics all of which are predictable using established, closed-form mathematical techniques. The profile of the array of rebound flow apertures and the profile of the array of compression flow apertures can be completely independent of each other, are not geometrically limited and are generally complex and irregular in shape.

In an alternative embodiment of the present disclosure, the hydraulic damper spool valve is mounted within the damper main body and the hydraulic damper is provided with flow passages that provide an unobstructed hydraulic path between the upper portion of the damper main body and the first opening, and the valve body is configured so as to provide an unobstructed hydraulic path between the lower portion of the damper main body and the second opening. In this manner, the hydraulic damper spool valve is stationary but the array of rebound flow apertures and array of compression flow apertures are configured to provide a single path, limiting hydraulic flow restriction between the upper portion and lower portion of the damper main body and these shaped apertures are adapted to be progressively opened and closed in response to the pressure differential across the main piston.

Further aspects of the disclosure will become apparent from the following description.

DETAILED DESCRIPTION

Figure 1:
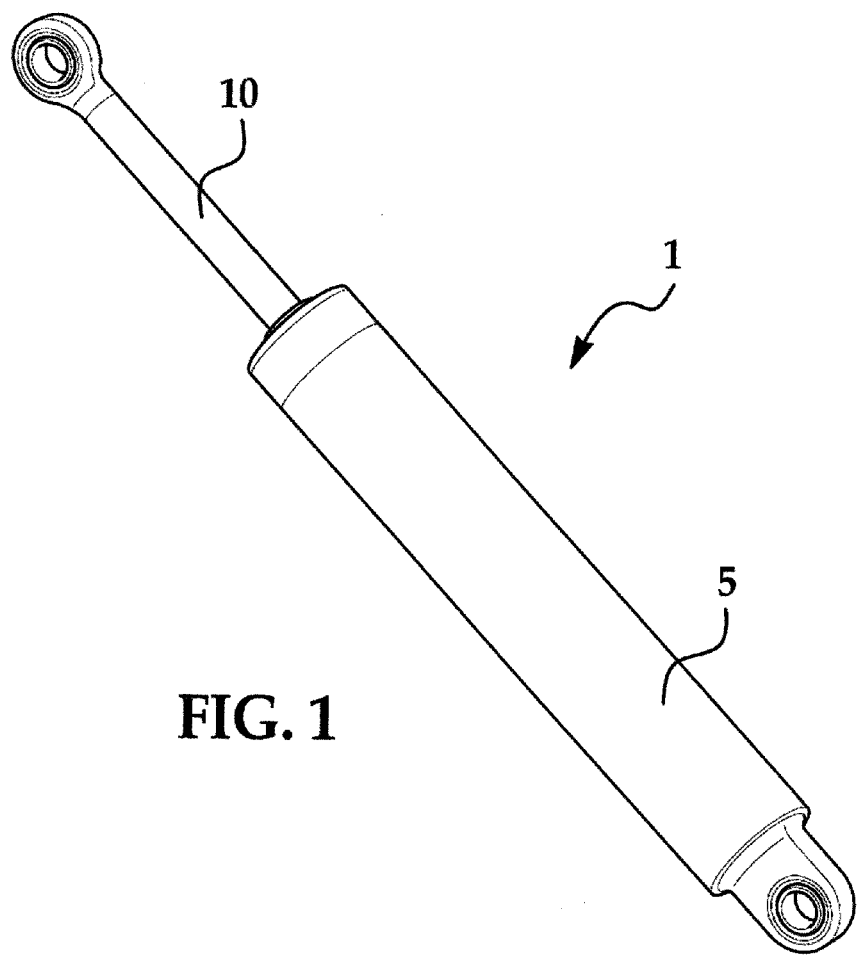
FIG. 1 is a perspective view of the hydraulic damper containing the hydraulic damper spool valve of the present disclosure.
Figure 2:
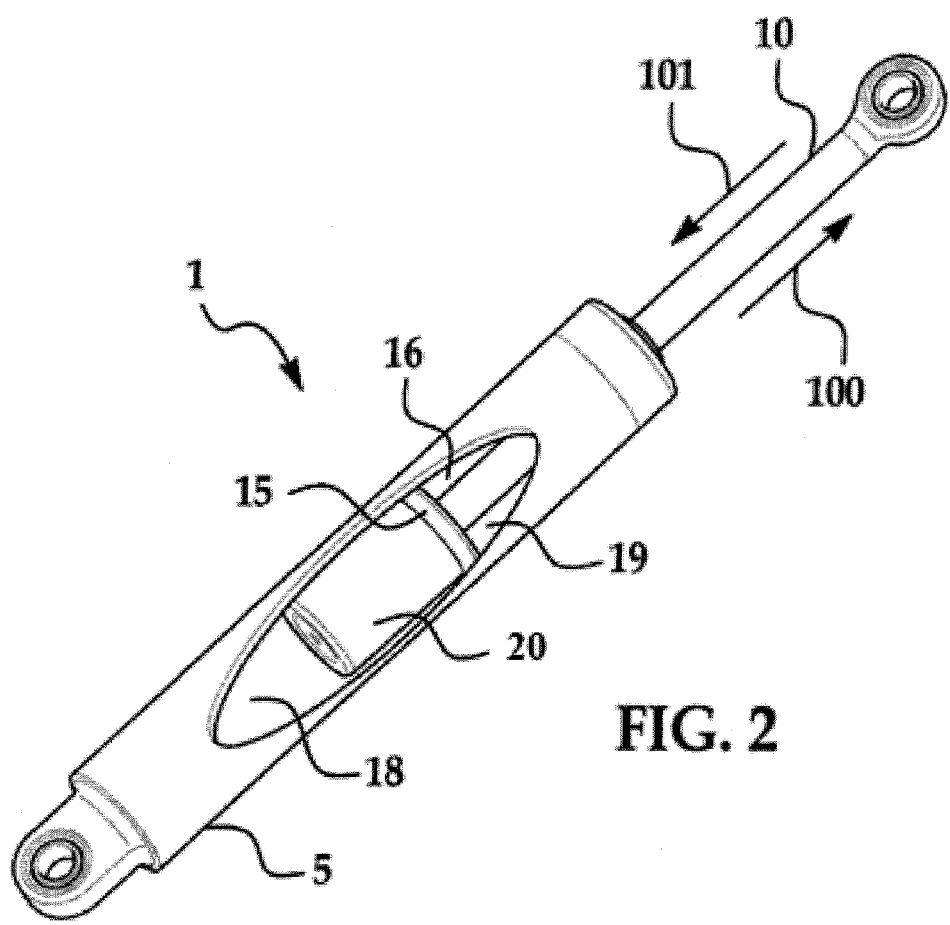
FIG. 2 is a partial cutaway perspective view of the hydraulic damper containing the hydraulic damper spool valve of the present disclosure.

Referring to FIGS. 1, and 2, a hydraulic damper assembly (1) consists of a main body (5), a shaft assembly (10) and a main piston (15) that is configured to divide the internal chamber of the main body (5) into an upper portion (16) and a lower portion (18). The upper portion (16) and lower portion (18) of the main body (5) contain hydraulic fluid (19). In an embodiment of the present disclosure, a hydraulic damper spool valve (20) is mounted to the hydraulic damper main piston (15). The hydraulic damper spool valve (20) may be affixed to the main piston (15) through a mechanical fastener or the like. As shown in the non-limiting example in FIGS. 1, 2, and 5, one or more seals (80) may be disposed between the hydraulic damper spool valve (20) and the main piston (15).

Referring to FIGS. 2, 3, 4 and 5 the hydraulic damper spool valve (20) comprises a valve body (30) which is configured with a first opening (35), a second opening (37) and stop surfaces (38) (39). The valve body (30) is arranged within the hydraulic damper assembly (1) so as to provide an unobstructed hydraulic path between the damper's upper portion (16) and the first opening (35). Moreover, the valve body (30) is further arranged within the hydraulic damper assembly (1) so as to provide an unobstructed hydraulic path between the damper's lower portion (18) and the second opening (37). The hydraulic damper spool valve (20) further includes a hollow cylindrical valve sleeve (40) which defines an internal cylindrical bore (41) and is adapted to be rigidly fixed within the valve body (30) so as to divide it into a closed outer volume (31) and an inner volume (32). The inner volume (32) defines a direct connection between the first opening (35) and second opening (37). The hollow cylindrical valve sleeve (40) is configured with an array of rebound flow apertures (43), an array of compression flow apertures (44) and an array of transfer flow apertures (45) adapted to hydraulically connect the outer volume (31) and the inner volume (32).

Figure 3:
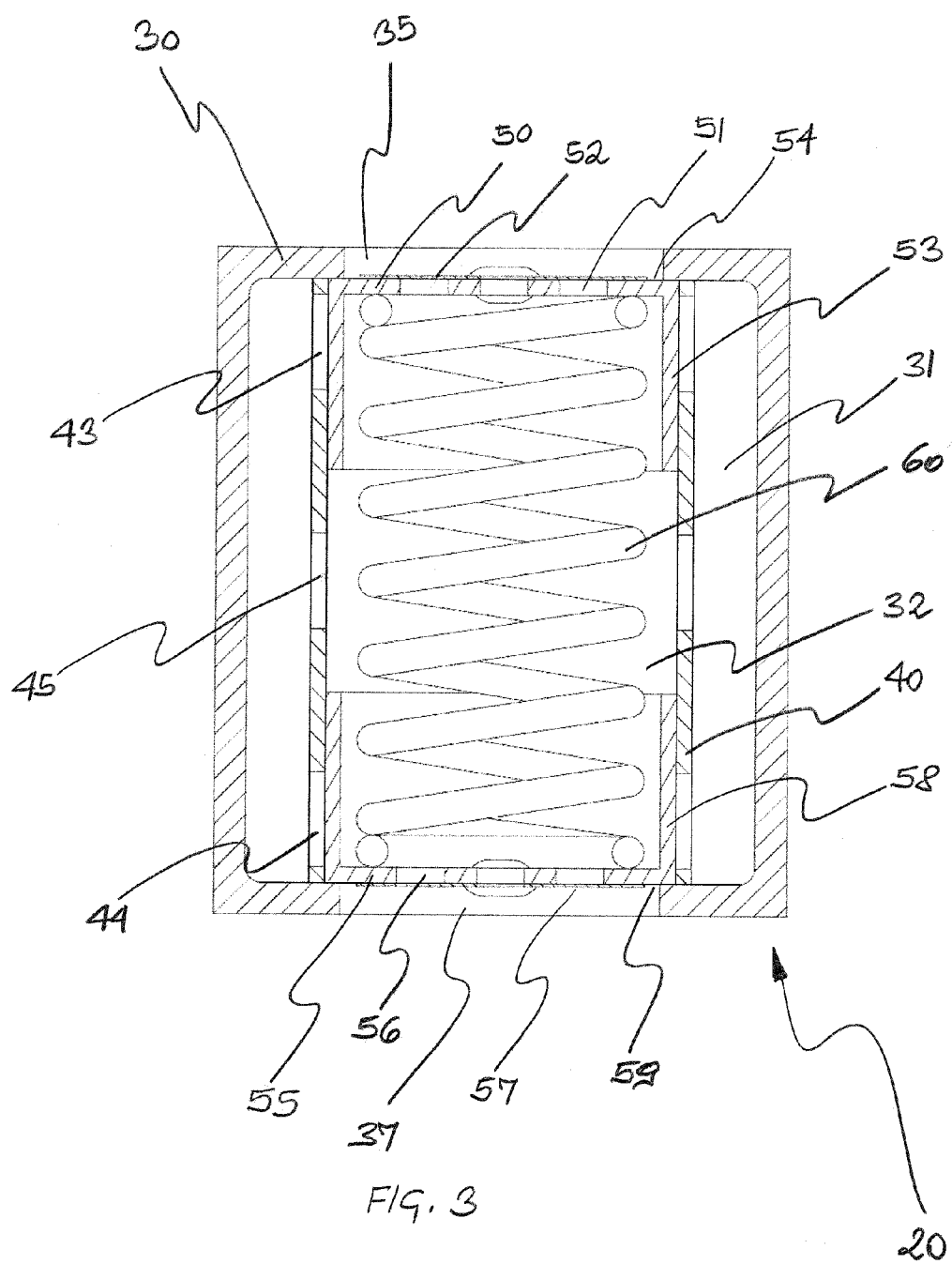
FIG. 3 is a sectional view of the hydraulic damper spool valve of the present disclosure.
Figure 4:
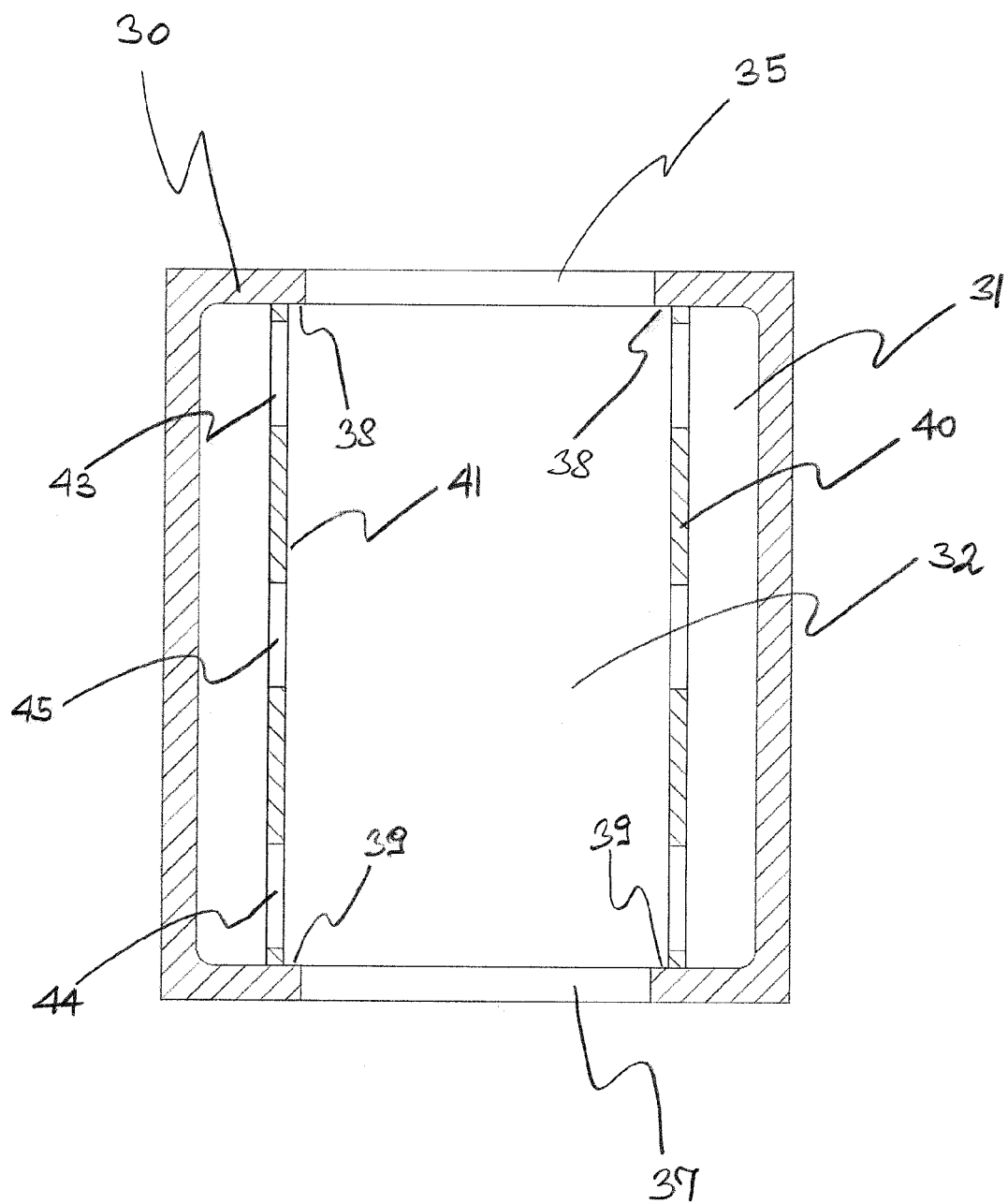
FIG. 4 is a selected sectional view of the valve body of the hydraulic damper spool valve of the present disclosure.
Figure 6:
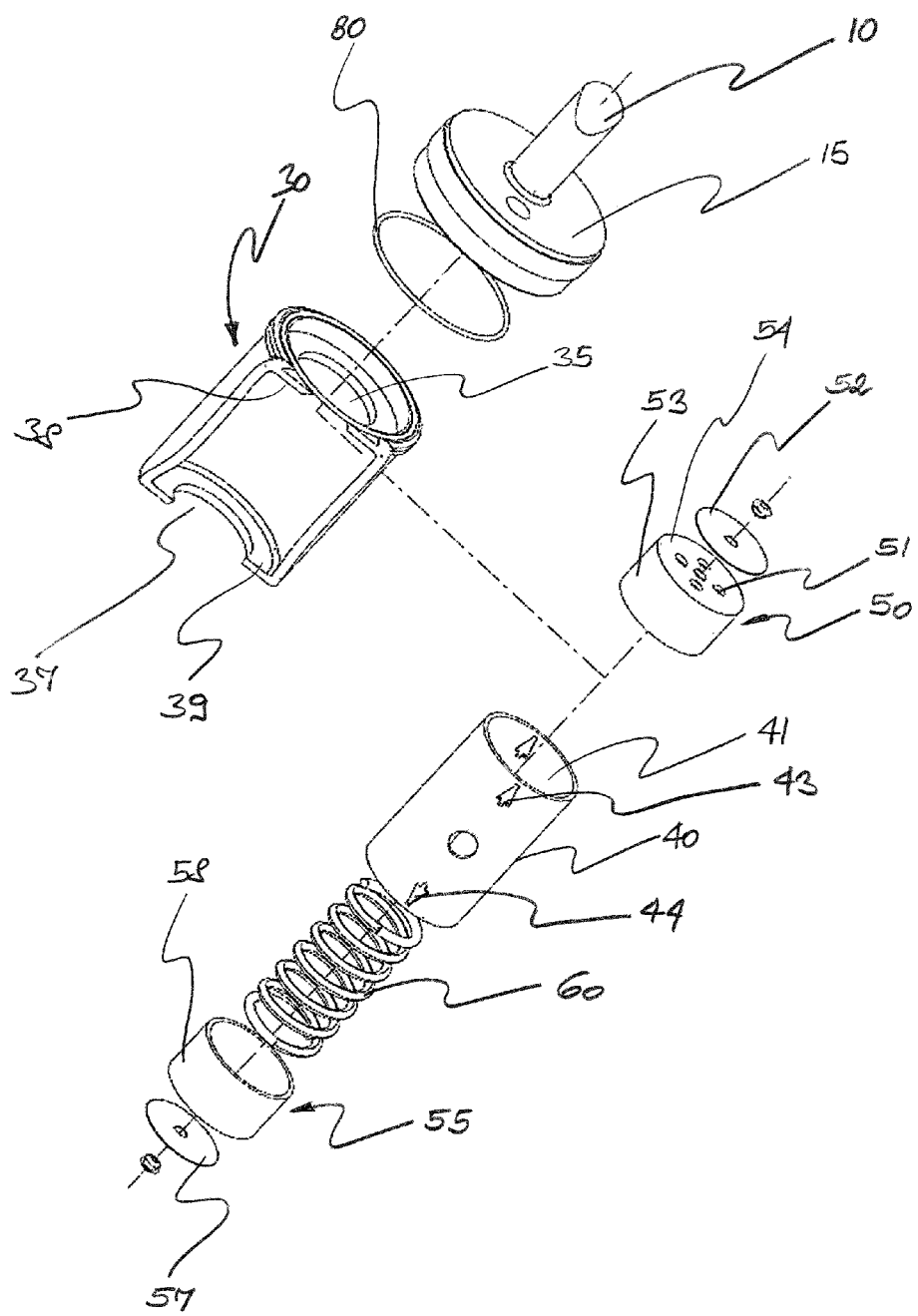
FIG. 6 is an exploded perspective view of the hydraulic damper spool valve of the present disclosure.

Referring to FIGS. 3 and 6 the internal cylindrical bore (41) of the hollow cylindrical valve sleeve (40) is adapted to receive a pair of valve spools (50)(55) with a predetermined, close tolerance radial clearance that is configured to allow longitudinal movement of the valve spools (50)(55) within the internal cylindrical bore (41) while preventing hydraulic flow through the radial clearance. A coil spring (60) or similar resilient energy storage means is arranged between the valve spools (50)(55) so as to bias them in opposite directions. The rebound control valve spool (50) is configured with an array of exit flow apertures (51), a one-way check shim (52) arranged to close the exit flow apertures (51), a cup shaped spool skirt (53) and a flat outer surface (54) that defines a first effective piston area. The compression control valve spool (55) is configured with an array of exit flow apertures (56), a one-way check shim (57) arranged to close the exit flow apertures (56), a cup shaped spool skirt (58) and a flat outer surface (59) that defines a second effective piston area.

Referring to FIGS. 2, 3, 4 and 6 when the hydraulic damper assembly (1) is at rest there is no induced pressure differential between the upper portion (16) and the lower portion (18). The coil spring (60) biases the valve spools (50)(55) in opposite directions so that the flat outer surface (54) of the rebound control valve spool (50) abuts the stop surface (38) of the valve body (30) and the flat outer surface (59) of the compression control valve spool (55) abuts the stop surface (39) of the valve body (30). When the rebound control valve spool (50) is biased to abut the stop surface (38) of the valve body (30) it is configured so that the entire array of rebound flow apertures (43) is completely blocked by the cup shaped spool skirt (53). When the compression control valve spool (55) is biased to abut the stop surface (39) of the valve body (30) it is configured so that the entire array of compression flow apertures (44) is completely blocked by the cup shaped spool skirt (58). When the array of rebound flow apertures (43) and array of compression flow apertures (44) are completely blocked the hydraulic connection between the first opening (35) and second opening (37) is closed. Hence, there is no hydraulic flow path between the upper portion (16) and the lower portion (18) of the main body (5) of the hydraulic damper assembly (1) when the rebound flow apertures (43) and compression flow apertures (44) are completely blocked by the valve spools (50)(55).

Figure 5:
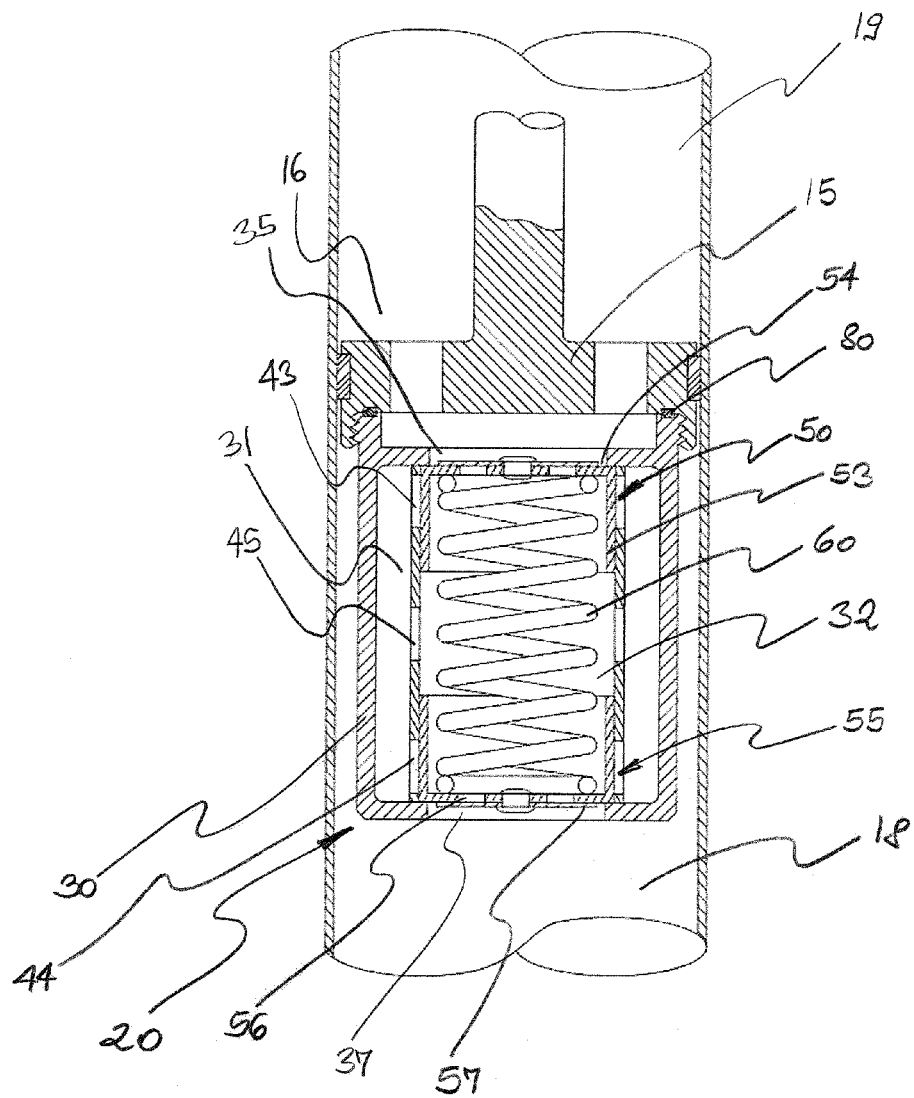
FIG. 5 is a sectional view of the hydraulic damper spool valve and main piston of the hydraulic damper of the present disclosure.

Referring to FIGS. 2, 3 and 5, when the hydraulic damper's main piston (15) moves in a first, rebound direction (100) the operating pressure generated in the hydraulic fluid (19) contained in the hydraulic damper's upper portion (16) acts upon the first effective piston area defined by the flat outer surface (54) of the rebound control valve spool (50) and induces longitudinal movement of the rebound control valve spool (50) against the biasing force of the coil spring (60). When the rebound control valve spool (50) moves longitudinally the cup shaped spool skirt (53) uncovers a portion of the rebound flow apertures (43) creating a hydraulic flow path between the first opening (35) and the outer volume (31). This hydraulic flow path allows the hydraulic fluid (19) to flow from the hydraulic damper's upper portion (16) into the outer volume (31) and subsequently into the inner volume (32) via the array of transfer flow apertures (45). The operating pressure in the hydraulic fluid (19) acts upon the inner surface of the one-way check shim (57) of the compression control valve spool (55) so as to create a flow path to the second opening (37) via the exit flow apertures (56). In this manner a continuous flow path is created between the hydraulic damper's upper portion (16) and lower portion (18) with the limiting hydraulic flow area restriction defined by the rebound flow apertures (43) of the hydraulic damper spool valve (20).

Varying the induced operating pressure of the hydraulic fluid (19) in the hydraulic damper's upper portion (16) creates a proportional longitudinal movement of the rebound control valve spool (50) against the biasing force of the coil spring (60) which in turn changes the area of the limiting hydraulic flow restriction by proportionally exposing larger and smaller areas of the rebound flow apertures (43). The hydraulic damper's (1) operating characteristics are therefore defined by the proportional opening and closing of the rebound flow apertures (43) in response to induced operating pressure which creates a mathematically predictable and stable pressure vs. flow relationship. This pressure vs. flow relationship of the hydraulic damper (1) can be tuned, when moving in a first, rebound, direction (100) by altering the rate of the coil spring (60), changing the pre-load on the coil spring (60), modifying the first effective piston area defined by the flat outer surface (54) of the rebound control valve spool (50) or by altering the profile shape of the rebound flow apertures (43).

Referring to FIGS. 2, 3 and 5, when the hydraulic damper's main piston (15) moves in a second, compression direction (101) the operating pressure generated in the hydraulic fluid (19) contained in the hydraulic damper's lower portion (18) acts upon the second effective piston area defined by the flat outer surface (59) of the compression control valve spool (55) and induces longitudinal movement of the compression control valve spool (55) against the biasing force of the coil spring (60). When the compression control valve spool (55) moves longitudinally the cup shaped spool skirt (58) uncovers a portion of the compression flow apertures (44) creating a hydraulic flow path between the second opening (37) and the outer volume (31). This hydraulic flow path allows the hydraulic fluid (19) to flow from the hydraulic damper's lower portion (18) into the outer volume (31) and subsequently into the inner volume (32) via the array of transfer flow apertures (45). The operating pressure in the hydraulic fluid (19) acts upon the inner surface of the one-way check shim (52) of the rebound control valve spool (50) so as to create a flow path to the first opening (35) via the exit flow apertures (51). In this manner a continuous flow path is created between the hydraulic damper's lower portion (18) and upper portion (16) with the limiting hydraulic flow area restriction defined by the compression flow apertures (44) of the hydraulic damper spool valve (20).

Varying the induced operating pressure of the hydraulic fluid (19) in the hydraulic damper's lower portion (18) creates a proportional longitudinal movement of the compression control valve spool (55) against the biasing force of the coil spring (60) which in turn changes the area of the limiting hydraulic flow restriction by proportionally exposing larger and smaller areas of the compression flow apertures (44). The hydraulic damper's (1) operating characteristics are therefore defined by the proportional opening and closing of the compression flow apertures (44) in response to induced operating pressure which creates a mathematically predictable and stable pressure vs. flow relationship. This pressure vs. flow relationship of the hydraulic damper (1) can be tuned, when moving in a second, compression, direction (101) by altering the rate of the coil spring (60), changing the pre-load on the coil spring (60), modifying the second effective piston area defined by the flat outer surface (59) of the compression control valve spool (55) or by altering the profile shape of the compression flow apertures (44).

It is to be understood that either the array of rebound flow apertures (43) or the array of compression flow apertures (44) could be configured as multiple shaped apertures or as a single shaped aperture defined in the hollow cylindrical valve sleeve (40). Regardless of the number of shaped apertures, they are all configured with a predetermined profile having a variable width which in turn facilitates desired pressure-flow characteristics between the first opening (35) and second opening (37) and vice-versa. At any point in the longitudinal movement of the valve spools (50)(55) the opening of the shaped apertures offers a mathematically predictive hydraulic flow restriction based on established orifice flow theory. For a given coil spring (60) rate and preload, the shaped aperture profiles can be configured to produce a wide range of pressure-flow characteristics all of which are predictable using established, closed-form mathematical techniques. The profile of the array of rebound flow apertures (43) and the profile of the array of compression flow apertures (44) can be completely independent of each other, are not geometrically limited and are generally complex and irregular in shape.

Figure 7:
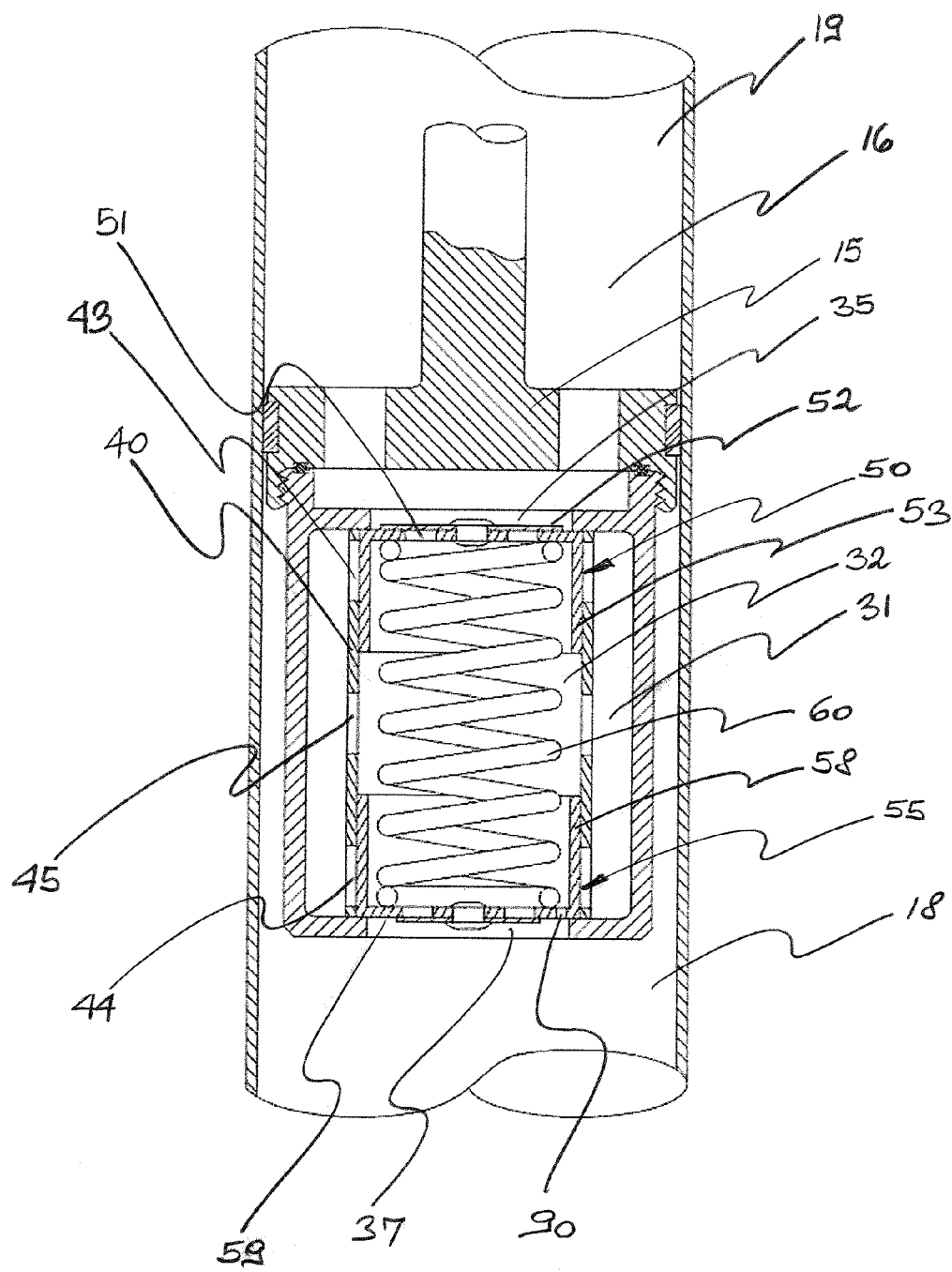
FIG. 7 is a sectional view of an alternative embodiment of the hydraulic damper spool valve and main piston of the hydraulic damper of the present disclosure.

FIG. 7 illustrates an alternative embodiment of the present disclosure in which the compression control valve spool (55) is configured with a separate bypass passage (90) that provides a direct, unobstructed hydraulic flow path between the damper's lower portion (18) and upper portion (16). The bypass passage (90) is configured so that the hydraulic fluid (19) can pass between the lower portion (18) and upper portion (16) when the compression flow apertures (44) are completely blocked by the cup shaped spool skirt (58) of the compression control valve spool (55). The bypass passage (90) is configured with a fixed area orifice that provides a predetermined square law pressure-flow relationship at low levels of main piston (15) movement. In this manner a sharp transition in the pressure-flow characteristic is avoided when longitudinal movement of the compression control valve spool (55) initially occurs.

Additionally the rebound control valve spool (50) can be configured with a separate bypass passage that provides a direct, unobstructed hydraulic flow path between the damper's upper portion (16) and lower portion (18). The bypass passage is configured so that the hydraulic fluid (19) can pass between the upper portion (16) and lower portion (18) when the rebound flow apertures (43) are completely blocked by the cup shaped spool skirt (53) of the rebound control valve spool (50). The bypass passage is configured with a fixed area orifice that provides a predetermined square law pressure-flow relationship at low levels of main piston (15) movement. In this manner a sharp transition in the pressure-flow characteristic is avoided when longitudinal movement of the rebound control valve spool (50) initially occurs.

In a further alternative embodiment of the present disclosure, the array of rebound flow apertures (43) is not completely blocked by the cup shaped spool skirt (53) when the flat outer surface (54) of the rebound control valve spool (50) is biased to abut the stop surface (38) of the valve body (30) by the coil spring (60). In this manner, a small unblocked portion of the rebound flow apertures (43) provides a predetermined, square law pressure-flow relationship at low levels of main piston (15) movement. It is to be understood that in this position the array of rebound flow apertures (43) is partially open when the rebound control valve spool (50) is biased fully to abut the stop surface (38). In this manner, a sharp transition in the pressure-flow characteristic is avoided when longitudinal movement of the rebound control valve spool (50) initially occurs.

In a further alternative embodiment of the present disclosure, the array of compression flow apertures (44) is not completely blocked by the cup shaped spool skirt (58) when the flat outer surface (59) of the compression control valve spool (55) is biased to abut the stop surface (39) of the valve body (30) by the coil spring (60). In this manner, a small unblocked portion of the compression flow apertures (44) provides a predetermined, square law pressure-flow relationship at low levels of main piston (15) movement. It is to be understood that in this position the array of compression flow apertures (44) is partially open when the compression control valve spool (55) is biased fully to abut the stop surface (39). In this manner, a sharp transition in the pressure-flow characteristic is avoided when longitudinal movement of the compression control valve spool (55) initially occurs.

Figure 8:
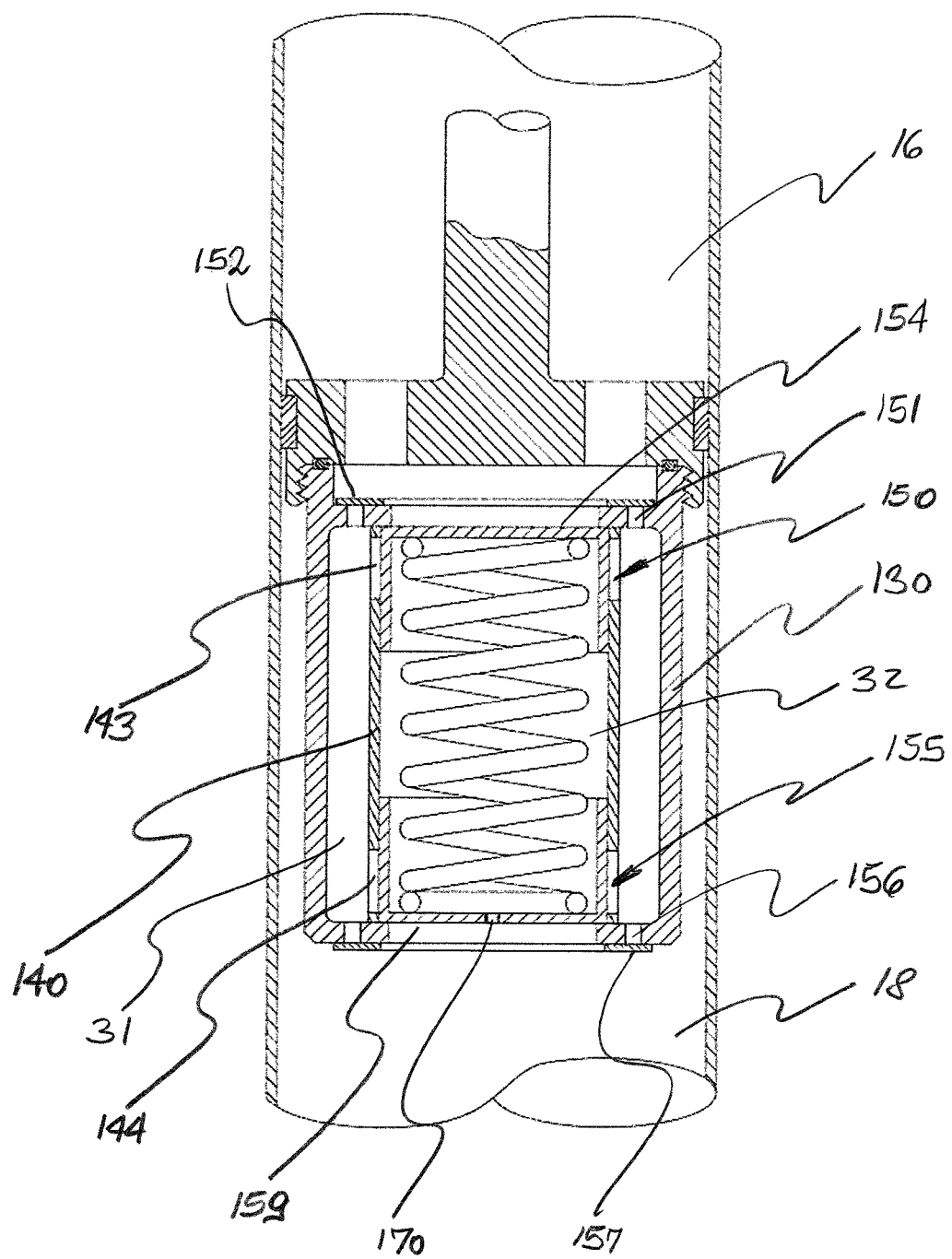
FIG. 8 is a sectional view of a further alternative embodiment of the hydraulic damper spool valve and main piston of the hydraulic damper of the present disclosure.

FIG. 8 illustrates an alternative embodiment of the present disclosure in which the valve body (130) is configured with an array of compression exit flow apertures (151) at one end and an array of rebound exit flow apertures (156) at its opposite end. These exit flow apertures (151)(156) replace the previously described exit flow apertures (51)(56) which were configured on the valve spools (50)(55). In this alternative embodiment the valve spools (150)(155) are configured so that their flat outer surfaces (154)(159) contain no exit flow orifices or one-way check shims. Additionally the valve body (130) is configured with a one-way annular check shim (152) arranged to close the compression exit flow apertures (151) and a second one-way annular check shim (157) arranged to close the rebound exit flow apertures (156). In this alternative embodiment the hollow cylindrical valve sleeve (140) does not contain the array of transfer flow apertures (45) previously described but is configured with an array of rebound flow apertures (143) and an array of compression flow apertures (144) identical to the preferred embodiment. In this manner the inner volume (32) has no connection to the closed outer volume (31). The compression control valve spool (155) is configured with an exhaust port (170) to allow trapped hydraulic fluid to exhaust from the closed inner volume (32). This exhaust port (170) could alternatively be located on the rebound control valve spool (150). Additionally, an unobstructed hydraulic path is provided between the damper's upper portion (16) and the compression exit flow apertures (151) and a second unobstructed path is provided between the damper's lower portion (18) and the rebound exit flow apertures (156). In this manner a continuous flow path is created between the hydraulic damper's upper portion (16) and lower portion (18) with the limiting hydraulic flow area restriction being defined, as in the preferred embodiment, by the rebound flow apertures (143) or compression flow apertures (144) but the hydraulic flow exits the closed outer volume directly via the exit flow apertures (151)(156).

Figure 9:
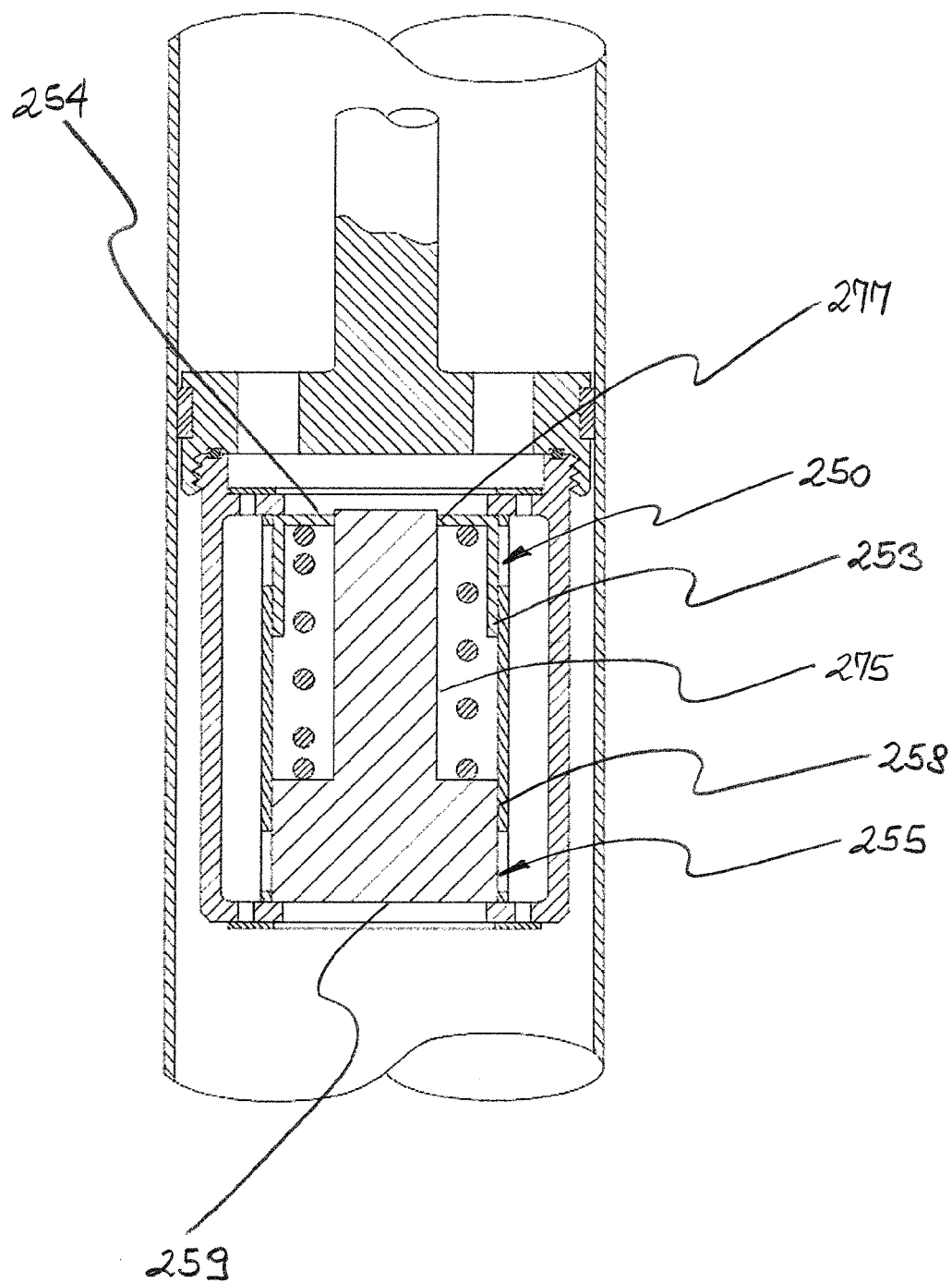
FIG. 9 is a sectional view of yet another further alternative embodiment of the hydraulic damper spool valve and main piston of the hydraulic damper of the present disclosure.

FIG. 9 illustrates a further alternative embodiment of the present disclosure in which the compression control valve spool (255) is configured with a cylindrical spool surface (258) and a flat outer surface (259) that defines a second effective piston area as described in the previous alternative embodiment, illustrated in FIG. 8, but additionally includes an axially aligned cylindrical column (275). Additionally, the rebound control valve spool (250) is configured with a cup shaped spool skirt (253) as described in the previous alternative embodiment, illustrated in FIG. 8, but additionally includes an axially aligned cylindrical bore (277) which creates an annular flat outer surface (254) that defines a first effective piston area. The cylindrical bore (277) of the rebound control valve spool (250) is adapted to receive the cylindrical column (275) of the compression control valve spool (255) with a predetermined, close tolerance radial clearance that is configured to allow relative longitudinal movement of the cylindrical column (275) of the compression control valve spool (255) within the cylindrical bore (277) of the rebound control valve spool (250) while preventing hydraulic flow through the radial clearance. In this manner the first effective piston area defined by the annular flat outer surface (254) can be configured to be significantly different than the second effective piston area defined by the flat outer surface (259). This arrangement offers higher levels of operating characteristic asymmetry than when using identical effective piston areas.

Figure 10:
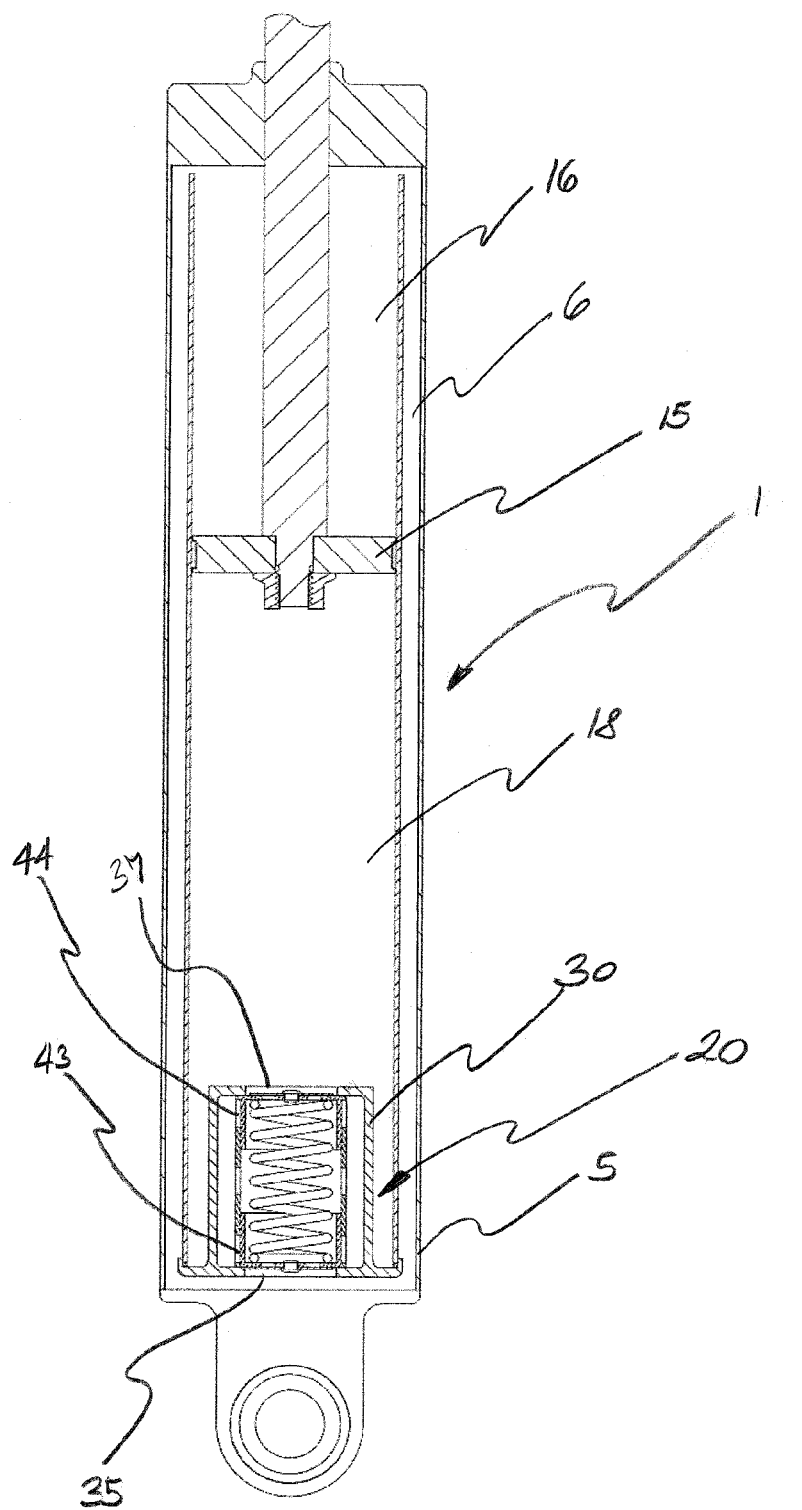
FIG. 10 is a sectional view of the hydraulic damper containing the hydraulic damper spool valve of the present disclosure in which an alternative embodiment of the mounting of the hydraulic damper spool valve is illustrated.

A further alternative embodiment of the present disclosure is shown in FIG. 10 in which the hydraulic damper spool valve (20) is mounted within the main body (5) of the hydraulic damper assembly (1). The main body (5) is provided with flow passages (6) that provide an unobstructed hydraulic path between the damper's upper portion (16) and the first opening (35) and the valve body (30) is further configured so as to provide an unobstructed hydraulic path between the damper's lower portion (18) and the second opening (37). In this manner, of the hydraulic damper spool valve (20) is stationary but the array of rebound flow apertures (43) and array of compression flow apertures (44) are configured to provide the limiting hydraulic flow area restriction between the upper portion (16) and lower portion (18) of the main body (5) of the damper and these shaped apertures (43)(44) are adapted to be progressively opened and closed in response to the pressure differential across the main piston (15).

What is claimed is:

1. A hydraulic damper spool valve for a hydraulic damper comprising:
   a valve body configured with openings at its opposing ends one of which is in fluid communication with an upper portion of the hydraulic damper and the other is in fluid communication with a lower portion of the hydraulic damper;
   a hollow cylindrical valve sleeve defining an internal bore and adapted to be fixed within the valve body so as to create a closed outer volume and an inner volume that directly connects the valve body openings;
   the hollow cylindrical valve sleeve configured with shaped apertures adapted to hydraulically connect the inner and outer volumes;
   a pair of valve spools operatively configured to be moveably disposed within the internal bore of the valve sleeve and adapted to selectively block the shaped apertures;
   the valve spools configured with one-way check shims adapted to allow hydraulic flow out of the inner volume;
   a resilient energy storage member disposed between the valve spools away from each other and in opposing direction to forces generated by operating pressures in the damper's hydraulic fluid;
   such that when the energy storage member is compressed as operating pressure is induced at either of the valve body openings one or the other of the valve spools moves relative to the valve sleeve so that an open area of the shaped aperture varies in a proportional relationship to the pressure thereby varying a hydraulic flow restriction between the upper portion of the hydraulic damper and the lower portion of the hydraulic damper and the hollow cylindrical valve sleeve is configured with an array of rebound flow apertures at one end, an array of compression flow apertures at its opposite end and an array of transfer flow apertures in proximity to its centre and the pair of valve spools consists of a rebound control valve spool configured to selectively open and close the rebound flow apertures and a compression control valve spool configured to selectively open and close the compression flow apertures;
   and the rebound control valve spool is configured with a flat outer surface, the compression control valve spool is configured with a flat outer surface, and the valve body is configured with stop surfaces which that when no operating pressure exists in the damper the resilient energy storage member biases the valve spools in opposing directions so that the flat outer surfaces of the valve spools abut the stop surfaces of the valve body and the rebound control valve spool completely blocks the array of rebound flow apertures and the compression control valve spool completely blocks the array of compression flow apertures so that there is no hydraulic path between the upper portion of the hydraulic damper and the lower portion of the hydraulic damper.

2. The hydraulic damper spool valve of claim 1 wherein a fixed orifice bypass passage is provided between the upper portion of the hydraulic damper and the lower portion of the hydraulic damper so as to provide a hydraulic flow path in parallel with the shaped apertures.

* * * * *